(12) United States Patent
Westgarth (10) Patent No.: US 11,668,415 B2
(45) Date of Patent: Jun. 6, 2023

(54) LOCKABLE CONNECTION BETWEEN TUBULAR MEMBERS

(71) Applicant: NATIONAL OILWELL VARCO UK LIMITED, Manchester (GB)

(72) Inventor: Richard Matthew Westgarth, Ouston (GB)

(73) Assignee: National Oilwell Varco UK Limited

( * ) Notice: Subject to any disclaimer, the term of this patent is extended or adjusted under 35 U.S.C. 154(b) by 229 days.

(21) Appl. No.: 16/770,886

(22) PCT Filed: Dec. 7, 2018

(86) PCT No.: PCT/US2018/064607
§ 371 (c)(1),
(2) Date: Jun. 8, 2020

(87) PCT Pub. No.: WO2019/113540
PCT Pub. Date: Jun. 13, 2019

(65) Prior Publication Data
US 2021/0190242 A1 Jun. 24, 2021

Related U.S. Application Data (60) Provisional application No. 62/596,547, filed on Dec. 8, 2017.

(51) Int. Cl.
| | |
|---|---|
| *F16L 19/00* | (2006.01) |
| *E21B 17/046* | (2006.01) |
| *E21B 17/042* | (2006.01) |
| *E21B 17/043* | (2006.01) |
| *F16L 19/025* | (2006.01) |

(52) U.S. Cl.
CPC .......... *F16L 19/005* (2013.01); *E21B 17/043* (2013.01); *E21B 17/0423* (2013.01); *E21B 17/0465* (2020.05); *F16L 19/025* (2013.01)

(58) Field of Classification Search
CPC ........ F16L 19/005; F16L 15/08; E21B 17/043
USPC .......................................................... 285/91
See application file for complete search history.

(56) References Cited

U.S. PATENT DOCUMENTS

| | | | |
|---|---|---|---|
| 1,570,155 A * | 1/1926 | Karbowski | ............. F16L 15/08 |
| 2,767,564 A | 10/1956 | Green | |
| 4,043,575 A | 8/1977 | Roth | |
| 4,165,891 A * | 8/1979 | Sullaway | ............... F16L 19/005 |
| 5,314,014 A | 5/1994 | Tucker | |
| 6,050,609 A | 4/2000 | Boscaljon et al. | |
| 6,860,525 B2 * | 3/2005 | Parks | |
| 7,146,704 B2 * | 12/2006 | Otten | ...................... F16L 15/08 |
| 7,434,848 B2 | 10/2008 | Boyd | |
| 8,690,200 B1 | 4/2014 | Patterson, Jr. | |

(Continued)

OTHER PUBLICATIONS

International Search Report and Written Opinion dated Feb. 22, 2019, for Application No. PCT/US2018/064607.

*Primary Examiner* — Zachary T Dragicevich
(74) *Attorney, Agent, or Firm* — Conley Rose, P.C.

(57) ABSTRACT

A connection between a first tubular member and a second tubular member includes a first tubular end, a second tubular end, a load shoulder member threadable onto the first tubular end, and a nut receivable around the first tubular end and the load shoulder member and threadable onto the second tubular end. The connection also includes a keyway through the load shoulder member and into the first tubular end to receive a key member.

19 Claims, 8 Drawing Sheets

(56) References Cited

U.S. PATENT DOCUMENTS

| | | |
|---|---|---|
| 8,827,316 B2 | 9/2014 | Raczynski et al. |
| 9,638,362 B2 | 5/2017 | Marchand |
| 9,759,358 B2 | 9/2017 | Koditkar |
| 9,771,761 B2 | 9/2017 | Marchand et al. |
| 2011/0049873 A1 | 3/2011 | Raczynski et al. |
| 2011/0147009 A1* | 6/2011 | Dupal .................. E21B 17/043 |
| 2013/0106102 A1 | 5/2013 | Marchand et al. |
| 2013/0146305 A1* | 6/2013 | Dupal .................. E21B 17/043 |
| 2015/0316180 A1 | 11/2015 | Marchand |

* cited by examiner

LOCKABLE CONNECTION BETWEEN TUBULAR MEMBERS

CROSS-REFERENCE TO RELATED APPLICATIONS

This application is a 35 U.S.C § 371 national stage application of PCT/US2018/064607 filed on Dec. 7, 2018, and entitled "Lockable Connection Between Tubular Members" which claims benefit of U.S. provisional patent application Ser. No. 62/596,547 filed Dec. 8, 2017, and entitled "Lockable Connection Between Tubular Members," both of which are hereby incorporated herein by reference in their entirety for all purposes.

STATEMENT REGARDING FEDERALLY SPONSORED RESEARCH OR DEVELOPMENT

Not applicable.

BACKGROUND

This disclosure relates generally to connecting a plurality of tubular members end-to-end. More particularly, it relates to a latchable or lockable connection between a pair of tubular members joined end-to-end, which may be joined as part of an operational string of tubular members for an oil well.

A conventional method for locking a pair of tubular members together is through "keying." This method involves fully screwing two tubular members together and then milling a connecting slot in the outside diameter of the two mating tubular members, to which a "key" can be inserted, thus preventing the tubular members from rotating independently of or relative to each other. If the slots were milled in the individual tubular members independent of each other, there is very little chance that when fully screwed together that the slots would line up to allow a key to be inserted.

With the keying method, once the two tubular members are keyed they become a bespoke pair, meaning they must be used together so that the key slots align once they are threaded together fully. Finding a third tubular member to replace one member of the bespoke pair successfully, without additional machining, is difficult and time-consuming. Thus, bespoke pairs of tubular members require that, if one of the keyed members needs to be replaced, a new one can be provided only if the mating member is sent to the manufacturer so that the key slot will be milled in the correct location to align with the mating member. This requirement causes a delay in providing a replacement member because, typically, an off-the-shelf member cannot be used, and extra wait time is caused by shipping the mating part to the manufacturer before fabrication begins. A new method for locking tubular members end-to-end could offer advantages.

BRIEF SUMMARY OF THE DISCLOSURE

An embodiment of a connection between a first tubular member and a second tubular member includes a first tubular end. In addition, the connection includes a second tubular end. Further, the connection includes a load shoulder member threadable onto the first tubular end. Still further, the connection includes a nut receivable around the first tubular end and the load shoulder member and threadable onto the second tubular end. The connection also includes a keyway through the load shoulder member and into the first tubular end to receive a key member.

In another embodiment, a method of connecting two aligned tubular members includes a sliding a nut over a first tubular end. In addition, the method includes threading a load shoulder member onto the first tubular end until a load shoulder member keyway aligns with a first tubular end keyway. Further, the method includes inserting a key member into the aligned load shoulder member and first tubular end keyways. Still further, the method includes engaging the first tubular end with the second tubular end such that a second tubular end recess receives a load shoulder member protrusion. Moreover, the method includes threading the nut onto the second tubular end.

In yet another embodiment, a connection between tubular members includes a first tubular end with a first externally threaded region and a seal region along an outer surface. In addition, the connection includes a second tubular member having a second tubular end with a second externally threaded region and a counter bore configured to slidingly receive the seal region. Further, the connection includes a load shoulder member threadable onto the first externally threaded region to form a first threaded interface. Still further, the connection includes a nut receivable around the outer surface of the first tubular end and threadable onto the second externally threaded region to form a second threaded interface. The load shoulder member and the second tubular end are engageable to form a castellated interface.

Thus, embodiments described herein include a combination of features and characteristics intended to address various shortcomings associated with certain prior devices, systems, and methods. The various features and characteristics described above, as well as others, will be readily apparent to those of ordinary skill in the art upon reading the following detailed description, and by referring to the accompanying drawings.

BRIEF DESCRIPTION OF THE DRAWINGS

For a detailed description of the disclosed exemplary embodiments, reference will now be made to the accompanying drawings, wherein.

NOTATION AND NOMENCLATURE

The following description is exemplary of certain embodiments of the disclosure. One of ordinary skill in the art will understand that the following description has broad application, and the discussion of any embodiment is meant to be exemplary of that embodiment, and is not intended to suggest in any way that the scope of the disclosure, including the claims, is limited to that embodiment.

The figures are not drawn necessarily to-scale. Certain features and components disclosed herein may be shown exaggerated in scale or in somewhat schematic form, and some details of conventional elements may not be shown in the interest of clarity and conciseness. In some of the figures, in order to improve clarity and conciseness, one or more components or aspects of a component may be omitted or may not have reference numerals identifying the features or components. In addition, within the specification, including the drawings, like or identical reference numerals may be used to identify common or similar elements.

As used herein, including in the claims, the terms "including" and "comprising," as well as derivations of these, are used in an open-ended fashion, and thus are to be interpreted to mean "including, but not limited to . . . ." Also, the term "couple" or "couples" means either an indirect or direct connection. Thus, if a first component couples or is coupled to a second component, the connection between the components may be through a direct engagement of the two components, or through an indirect connection that is accomplished via other intermediate components, devices and/or connections. The recitation "based on" means "based at least in part on." Therefore, if X is based on Y, then X may be based on Y and on any number of other factors. The word "or" is used in an inclusive manner. For example, "A or B" means any of the following: "A" alone, "B" alone, or both "A" and "B." In addition, the word "substantially" means within a range of plus or minus 10%.

In addition, the terms "axial" and "axially" generally mean along or parallel to a given axis, while the terms "radial" and "radially" generally mean perpendicular to the axis. For instance, an axial distance refers to a distance measured along or parallel to a given axis, and a radial distance means a distance measured perpendicular to the axis.

The plural term "threads" broadly refer to a single, helical thread path, to multiple, parallel helical thread paths, or to portions of one or more thread paths, such as multiple crests axially spaced-apart by multiple troughs. The use of ordinal numbers (i.e., first, second, third, etc.) to identify one or more components within a possible group of multiple similar components is done for convenience and clarity. Ordinal numbers that may be used outside the claims for members of a particular group of components may not necessarily correspond to the ordinal numbers used within the claims when referring to various members of the same group or a similar group of components.

DETAILED DESCRIPTION OF THE DISCLOSED EXEMPLARY EMBODIMENTS

Figure 1:
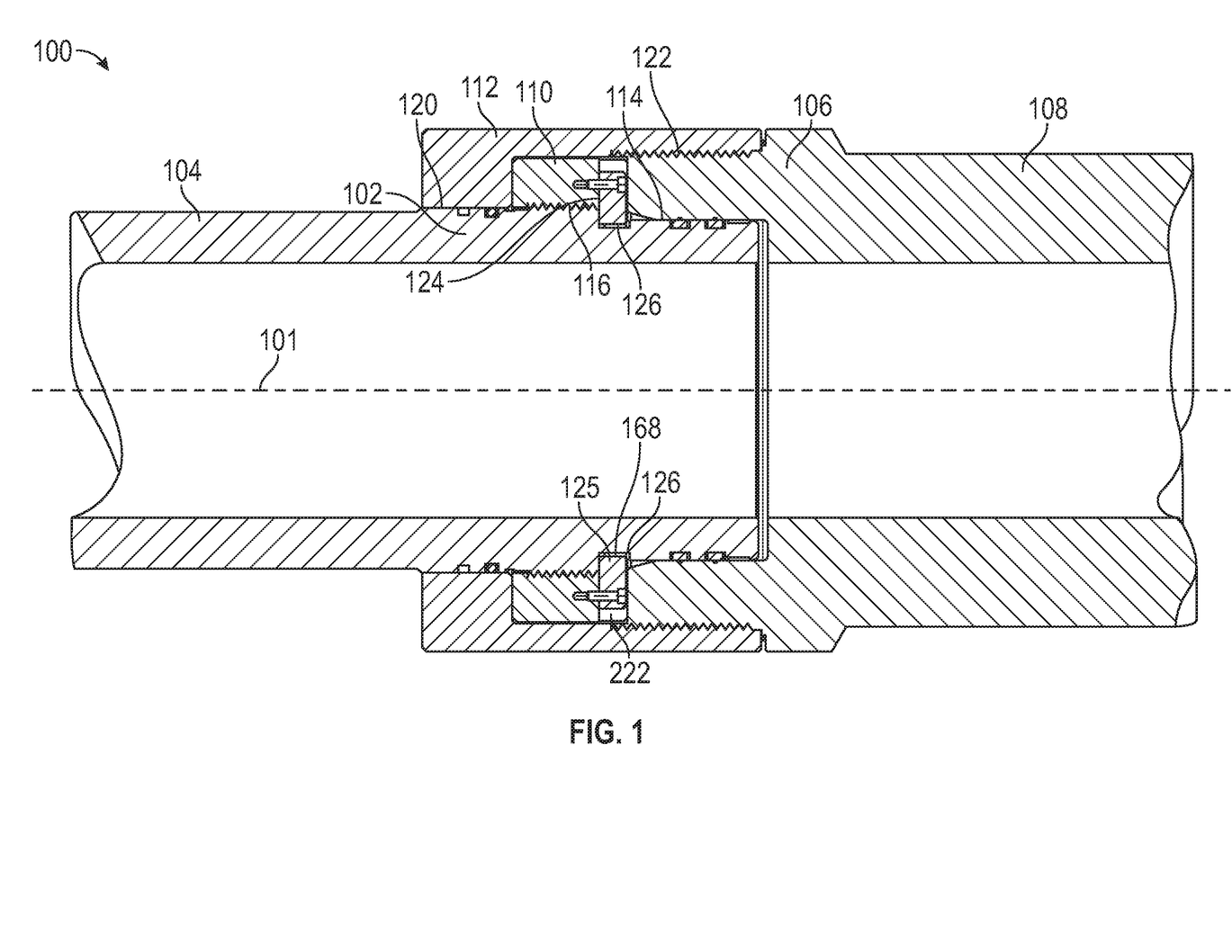
FIG. 1 shows a cross-sectional side view, taken along a first plane, of a connection between two tubular members in accordance with principles described herein.
Figure 2:
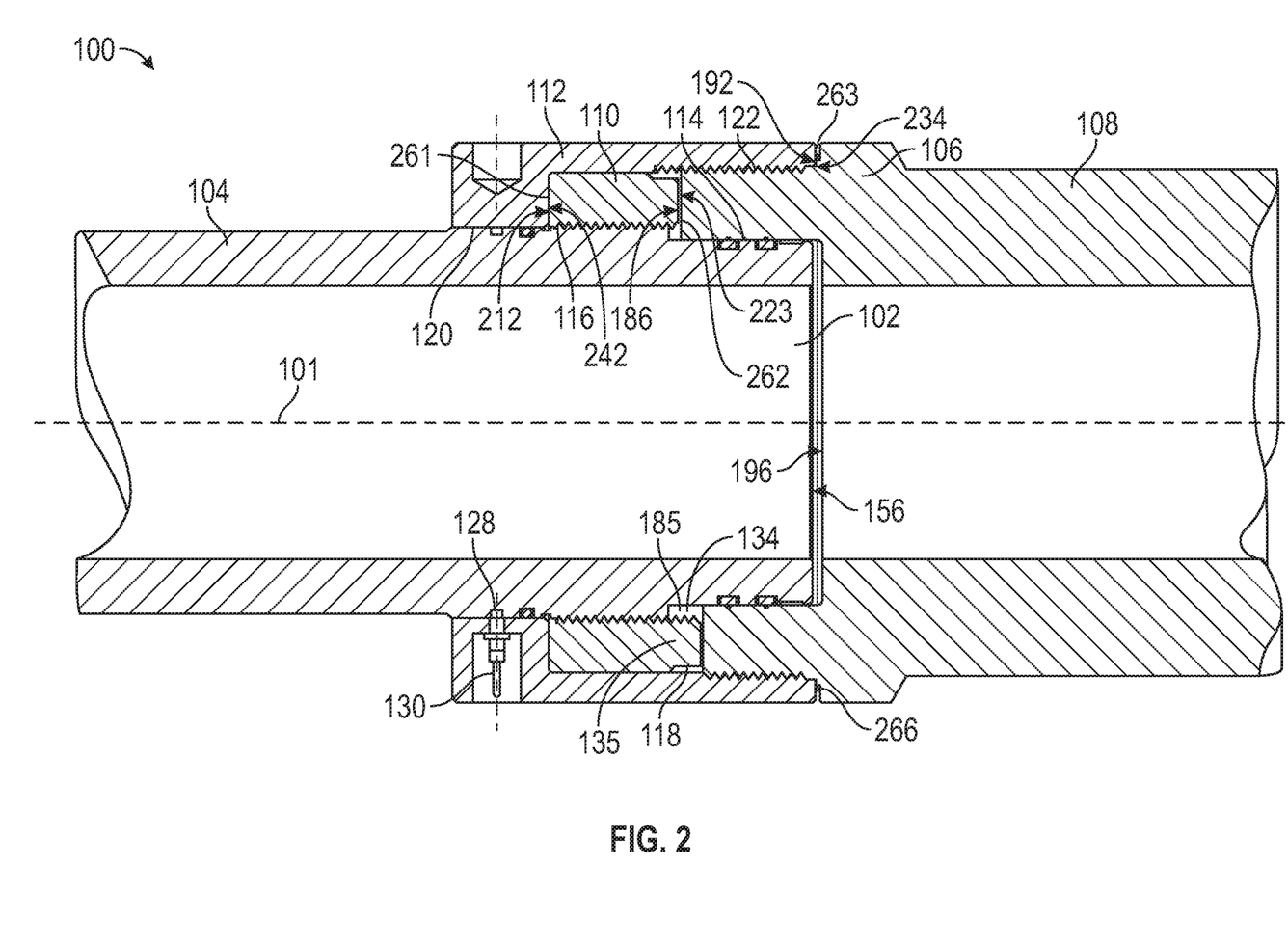
FIG. 2 shows a second cross-sectional side view of the connection of FIG. 1, taken along a second plane.

Referring to FIG. 1 and FIG. 2, in an exemplary embodiment, a tubular connection 100 formed along a longitudinal or central axis 101 includes a first tubular end 102 of a first tubular member 104, a second tubular end 106 of a second tubular member 108, a load shoulder member 110, and a tubular nut 112. In this example, first tubular end 102 is a pin end 102 and the second tubular end 106 is a box end 106. Pin end 102 is received into box end 106 at a first slidingly-engageable, rotatable interface 114. Load shoulder member 110 is threadingly coupled to pin end 102 at a first threaded interface 116 and is coupled to box end 106 at a castellated interface 118 (FIG. 2). Tubular nut 112 is slidingly received on pin end 102 at a second slidingly-engageable, rotatable interface 120. In some embodiments, rotatable interfaces 114, 120 are configured as sealing interfaces. Nut 112 extends over and beyond member 110 and is threadingly coupled to box end 106 at a second threaded interface 122, capturing the load shoulder member 110 between the nut 112 and box end 106.

Figure 3:
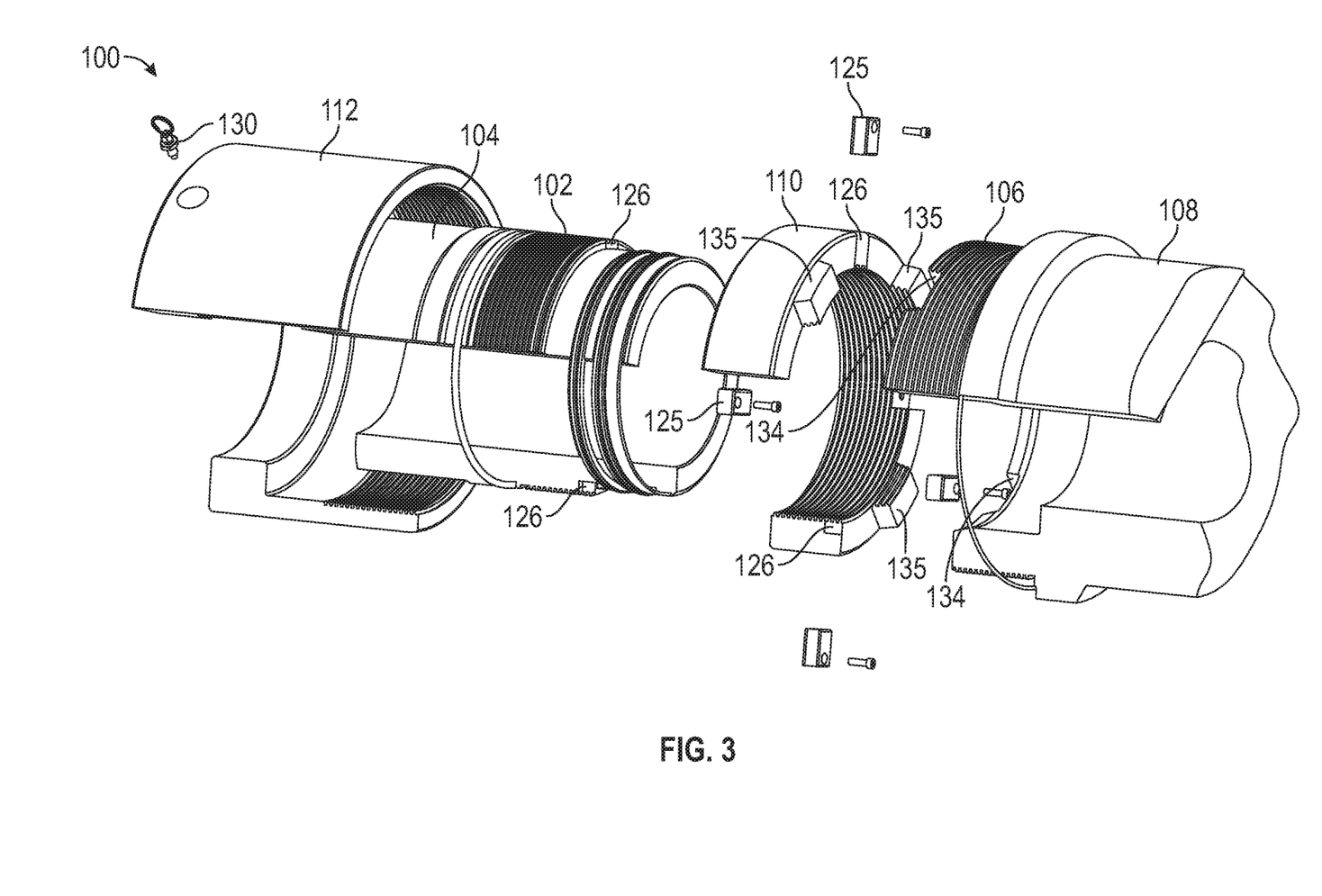
FIG. 3 shows an exploded view in partial cross-section of the connection between two tubular members of FIG. 1.

Shown in FIG. 1, a keyed interface 124 extends radially between load shoulder member 110 and pin end 102, the keyed interface 124 being located axially adjacent the interface 118 of member 110 and tubular end 106. Interface 124 includes a key member 125 disposed within a radially extending keyway 126 that is formed in both member 110 and end 102, intersecting the first threaded interface 116. Shown in FIG. 2, a pinned interface 128, including a plunger or pin 130, extends radially through nut 112 and into tubular end 102. Connection 100 and its components are also shown in the exploded view of FIG. 3. FIG. 3 shows that, at least in this example, keyed interface 124 includes a plurality of keyways 126 configured to receive a plurality of key members 125, and castellated interface 118 includes a plurality of recesses 134 in box end 106 configured to receive a plurality of axial protrusions 135 in load shoulder member 110. More specifically, this embodiment includes four pairs of keyways 126 and key members 125 and four pairs of recesses 134 and protrusions 135. As shown in FIGS. 2 and 3, recesses 134 and protrusions 135 of castellated interface 118 are configured to engage end-to-end without overlapping in the radial direction. Based on their placement, recesses 134 may also be called second tubular end recesses, and protrusions 135 may also be called load shoulder member protrusions.

Figure 4:
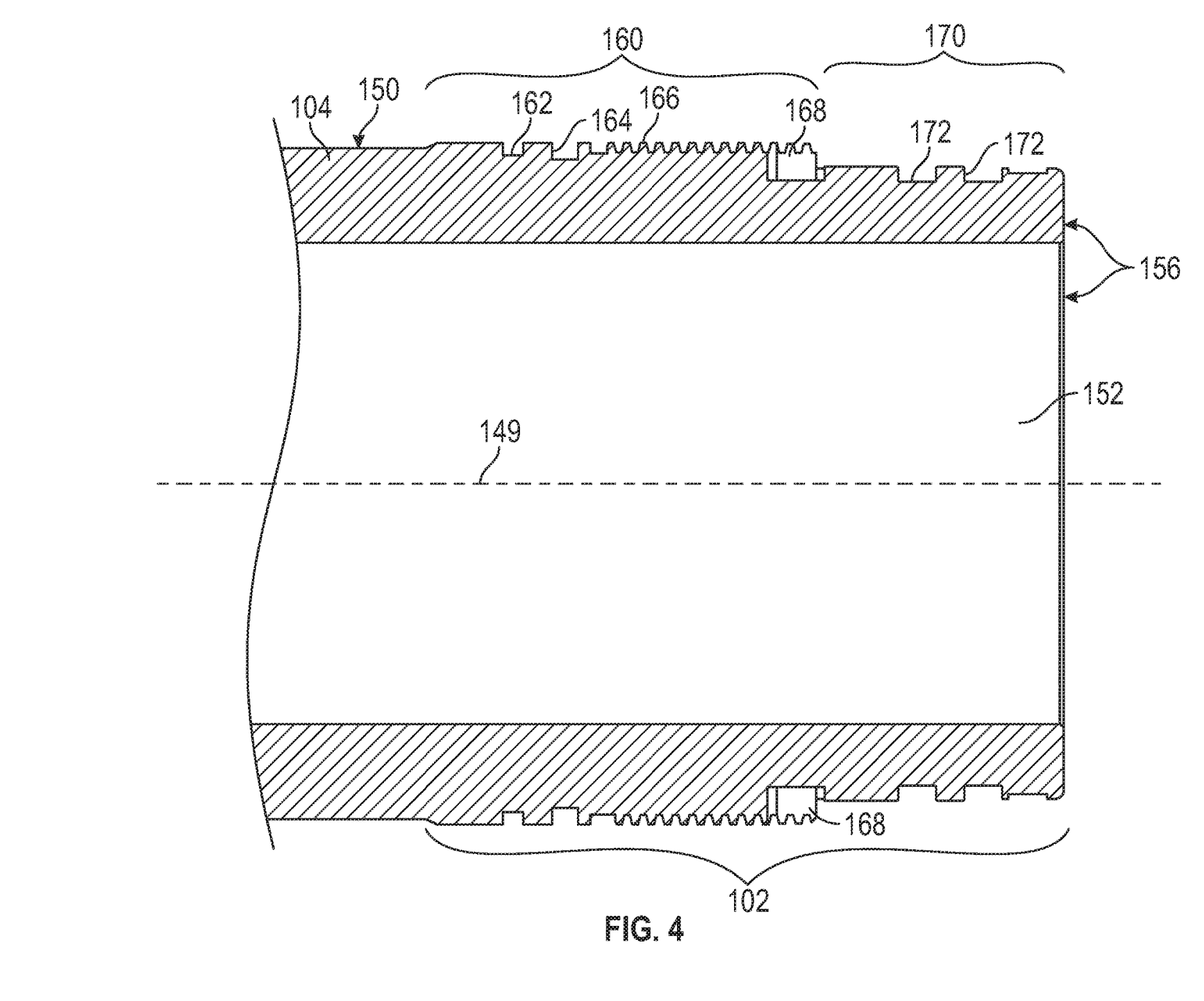
FIG. 4 shows a cross-sectional side view of the first tubular member of the connection of FIG. 1 including a first tubular end, in accordance with principles described herein.

Referring now to FIG. 4, first tubular member 104, which extends along a longitudinal or central axis 149, includes an outer surface 150 and a central through-channel 152, both extending axially from an end face 156 of pin end 102. At end 102, outer surface 150 includes a recessed seal region 170 that extends axially from end face 156 and a connection region 160 that extends axially from region 170 and is axially spaced-apart from end face 156. In the present embodiment, connection region 160 is, in general, raised with respect to others portions of outer surface 150, and seal region 170 is, in general, recessed with respect to connection region 160 and with respect to other portions of outer surface 150. Connection region 160 includes a lock groove 162, a seal groove 164, and a threaded region 166, all axially spaced-apart. A plurality of keyways 168 are disposed in threaded region 166 proximal end face 156. Due to their location, keyways 168 may be called first tubular end keyways 168. The first tubular end keyways 168 form the inner portions of each keyway 126 in FIG. 1. Continuing to reference FIG. 4, seal region 170 includes first and second annular seal grooves 172, axially spaced-apart from each other. Threaded region 166 includes straight, Acme threads having a single thread path, but other embodiments may include a different type of thread or additional thread paths.

Figure 5:
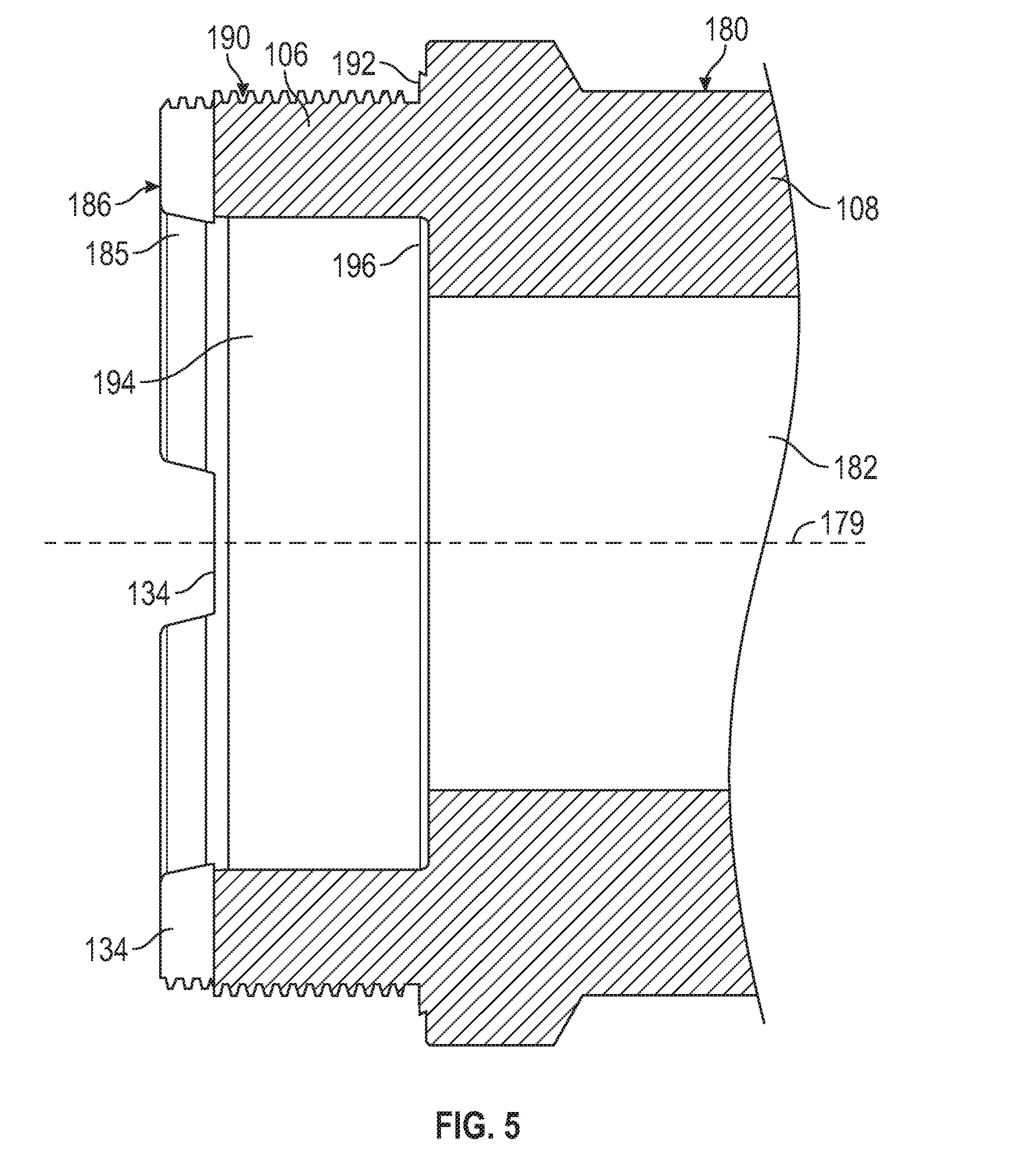
FIG. 5 shows a cross-sectional side view of the second tubular member of the connection of FIG. 1 including a second tubular end, in accordance with principles described herein.

Referring now to FIG. 5, second tubular member 108, which extends along a longitudinal or central axis 179, includes an outer surface 180 and a central through-channel 182, both extending axially from a terminal end or shoulder 185 of box end 106. Shoulder 185 includes an end face 186 and the plurality of recesses 134, which extend axially inward from end face 186. Along box end 106, outer surface 180 includes an external threaded region 190 extending from end face 186, followed by an annular, external shoulder 192, spaced-apart from end face 186. From shoulder 185, a counter bore 194 extends, intersecting the remainder of channel 182 at an internal, outward facing shoulder 196. Counter bore 194 is to slidingly and rotatably receive the seal region 170 of first tubular member 104 (FIG. 4). Internal shoulder 196 of member 108 is axially adjacent the end of threaded region 190 or the location of external shoulder 192, which may coincide. In some other embodiments, shoulder 196 is axially spaced-apart from threaded region 190 or external shoulder 192. From end face 186, the plurality of recesses 134 extend axially inward for a distance equivalent to several threads (for example, several peaks and troughs) of threaded region 190. Recesses 134 extend radially through the wall thickness of box end 106. In FIG. 5, box end 106 has external threads and lacks any internal threads. Threaded region 190 includes straight, Acme threads having a single thread path, but other embodiments may include a different type of thread or additional thread paths. In FIG. 2, shoulder 185, including recesses 134, participates in castellated interface 118.

Figure 6:
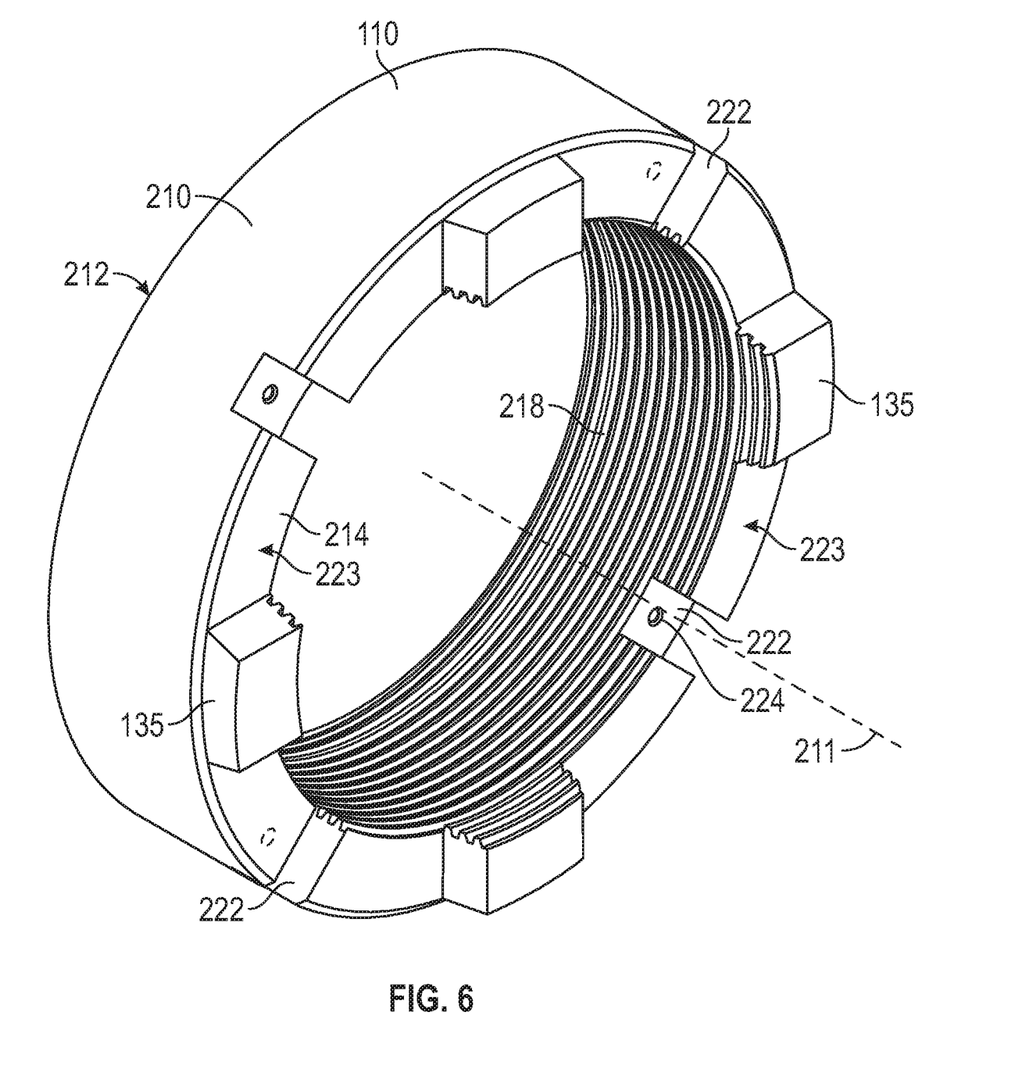
FIG. 6 shows a perspective view of the load shoulder member of the connection of FIG. 1.

Shown in FIG. 6, load shoulder member 110 includes an annular body 210 extending along a longitudinal or central axis 211 from a first end or shoulder 212 to a second end or shoulder 214. An internal threaded region 218 extends along the inner surface of member 110. Second shoulder 214 includes the axial protrusions 135 and axial recesses or keyways 222, which extend axially in the opposite direction, and a plurality of surface regions 223 disposed axially between protrusions 135 and keyways 222. In FIG. 6, surface regions 223 are flat and perpendicular to central axis 211, but some embodiments may include a radial taper or contour on regions 223. Each keyway 222 includes a threaded hole 224. Keyways 222 extend radially through body 210 including threaded region 218. Threaded region 218 extends axially along the inner surface of protrusions 135. Due to their location, keyways 222 may be called load shoulder member keyways 222. Keyways 222 form outer portions of each keyway 126 in FIG. 1. Threaded region 218 includes straight, Acme threads having a single thread path, but other embodiments may include a different type of thread or additional thread paths.

When made-up, as shown in FIGS. 1, the connection 100 includes one or more first tubular end keyways 168 that each align with a counterpart or corresponding load shoulder member keyway 222 to form one or more aligned or made-up connection keyways 126, which receive one or more key members 125. In this manner, the load shoulder member 110 is keyed to the first tubular end 102, and vice-versa. In other words, in this embodiment, the keying or keyed interface 124 in the connection 100 is between the load shoulder member 110 and the first tubular member end 102.

Figure 7:
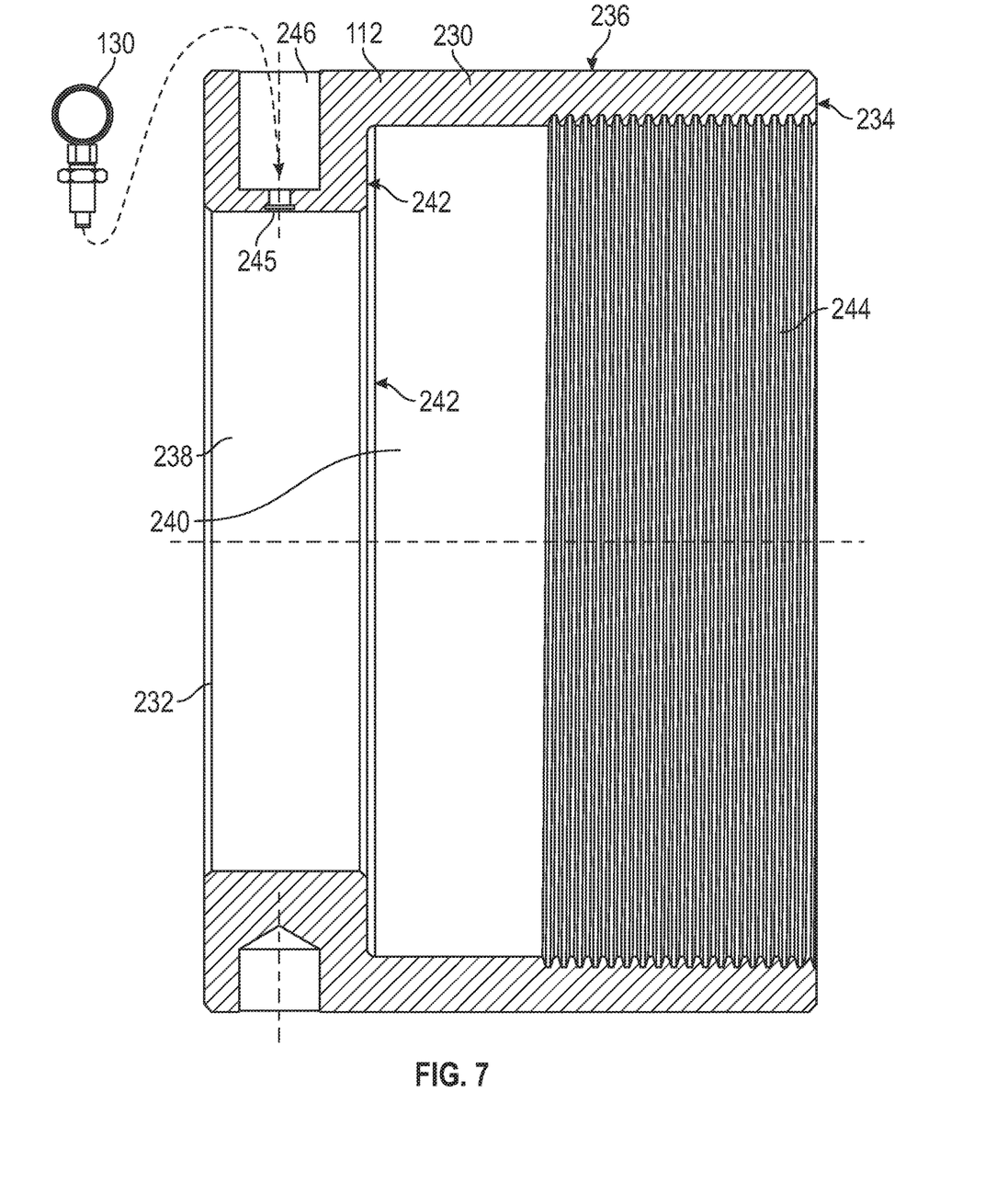
FIG. 7 shows a cross-sectional view of the tubular nut of the connection of FIG. 1.

Shown in FIG. 7, tubular nut 112 includes an annular body 230 extending from a first end 232 to a second end or external shoulder 234 having an outer surface 236, a first bore 238 extending inward from first end 232, and a second bore 240 extending from bore 238 to shoulder 234. The intersection of bores 238, 240 form an internal shoulder 242 facing toward second end 234. An internal threaded region 244 is disposed along bore 240 extending from external shoulder 234 toward internal shoulder 242. A through-bore 245 extends radially from the internal surface of bore 238 and expands to a counter bore 246 that intersects outer surface 236. Pin 130, which is intended to be threaded into bore 245, is also shown in FIG. 7, so in this example, pin 130 is a threaded member, but other configurations for holding pin 130 within bore 245 are contemplated. Threaded region 244 includes straight, Acme threads having a single thread path, but other embodiments may include a different type of thread or additional thread paths.

Reference is again made to FIG. 2. Threaded interface 116 is formed between threaded region 166 of pin end 102 and threaded region 218 of load shoulder member 110. Threaded interface 116 is formed between threaded region 190 of box end 106 and threaded region 244 of nut 112. In addition to the interfaces previously described, the assembled connection 100 also includes three shoulder interfaces 261, 262, 263. One or more of these shoulder interfaces may transfer an axial load, based on the axial arrangement or tightness of the threaded interfaces 116, 122. A first shoulder interface 261 is formed between first shoulder 212 of member 110 and internal shoulder 242 of nut 112. Adjacent to castellated interface 118, end face 186 on box end 106 and surface regions 223 of second shoulder 214 on member 110 form a second shoulder interface 262. A third shoulder interface 263 is formed between external shoulder 234 of nut 112 and external shoulder 192 of box end 108. In some embodiments or some implementations of an embodiment, one or more of the shoulder interfaces 261, 262, 263 may not be formed tightly as the result of the corresponding pair(s) of surfaces loosely contacting or not contacting each other due to a length of nut 112 or a lack of tightness in a threaded interface 116, 122. In the example of FIG. 2, interfaces 261, 262 are tightened axially by threaded interfaces 116, 122 to achieve contact between the corresponding members within each interface 261, 262. However, the members of interface 263 and the members of castellated interface 118 are not tightened axially and may include gaps therebetween to prevent surface contact and to insure that the other interfaces 261, 262 can be fully tightened. A seal 266 is included in interface 263 to inhibit the ingress of fluids or debris.

At least in the present embodiment, connection 100 lacks a threaded interface between (e.g., involving or engaging) and lacks a shoulder interface between pin end 102 and box end 106. In the current embodiment, the only direct interface between ends 102, 106 is the sealed, rotatable interface 114 formed between region 170 of outer surface 150 and counter bore 194. Even the end faces or shoulders 156, 196 that face each other do not engage in the example of FIGS. 1 and 2, and neither does end face 186 of box end 106 engage with pin end 102. There is no direct interface or engagement between ends 102, 106 that inhibits relative axial movement, and there is no direct interface or engagement between ends 102, 106 that inhibits relative rotation between ends 102, 106. Thus, there is no direct interface or engagement between ends 102, 106 that is configured to (e.g., capable of) transferring axial loads or torque. Thus, connection 100 lacks an interface configured to transfer torque directly between tubular ends 102, 106. Instead, the threaded interfaces 122, 116 and one or more of the shoulder interfaces 261, 262, 263 are configured to transfer axial loads between ends 102, 106 and to prevent or limit axial movement of end 102 relative to end 106. Castellated interface 118 and the keyed interface 124 are configured to transfer torque between ends 102, 106 and to prevent or limit rotational movement of end 102 relative to end 106, while the keyed interface 124 is disposed and engaged between the end 102 and the load shoulder member 110. Pinned interface 128 is configured to prevent or limit the rotational disengagement of threaded interface 122 to keep connection 100 intact in the event of vibration or rotational cycling back and forth. Pinned interface 128 is therefore a rotation-inhibiting interface capable of transferring torque. When connection 100 is made-up or, equivalently, is assembled, the sealed, rotatable interfaces 114, 120 are no longer capable of rotating based on castellated interface 118 and the keyed interface 124 inhibits relative rotation between tubular members 104, 108.

Figure 8:
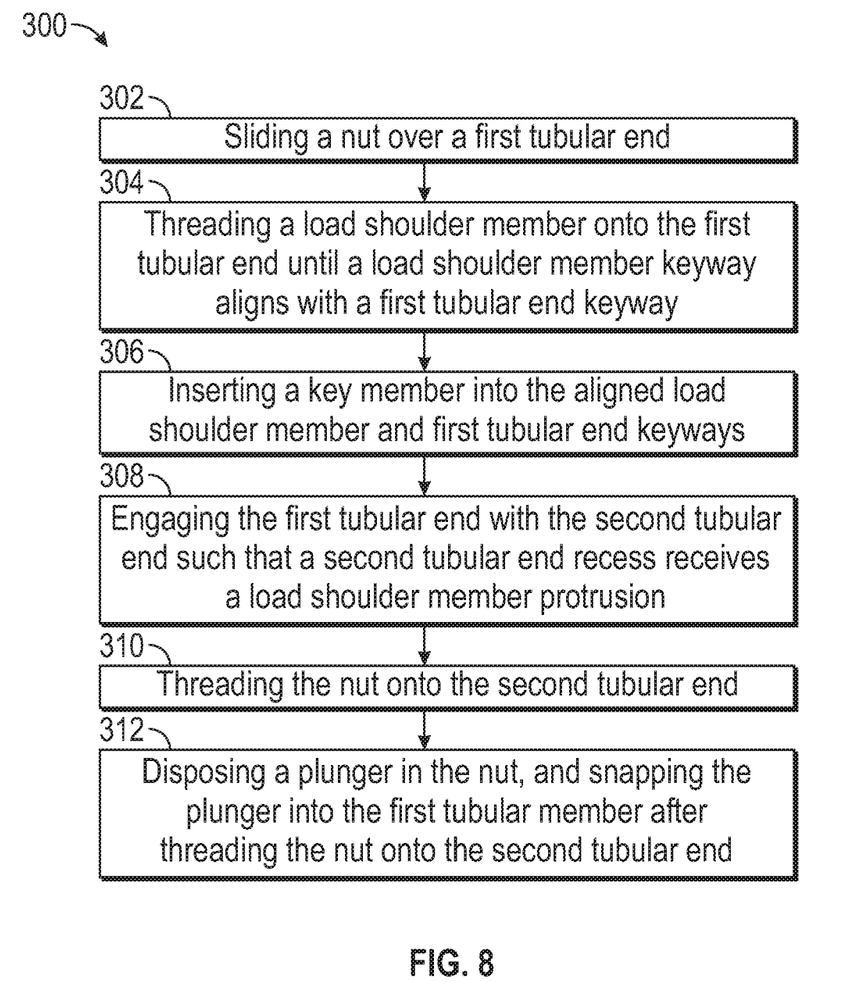
FIG. 8 shows a flow diagram showing a method for connecting two aligned tubular members in accordance with principles disclosed herein.

FIG. 8 shows a method 300 for connecting two aligned tubular members in accordance with the principles described herein. At block 302, method 300 includes sliding a nut over a first tubular end. Block 304 includes threading a load shoulder member onto the first tubular end until a load shoulder member keyway aligns with a first tubular end keyway.

Block 306 includes inserting a key member into the aligned load shoulder member and first tubular end keyway. Block 308 includes engaging the first tubular end with the second tubular end such that a second tubular end recess receives a load shoulder member protrusion. Block 310 includes threading the nut onto the second tubular end. Block 312 includes disposing a plunger in the nut, and snapping the plunger into the first tubular member after threading the nut onto the second tubular end.

Method 300 may be utilized, for example, to assemble connection 100, as described with reference to FIGS. 1-7. In general, working in reverse, the steps of method 300 may be utilized to disassemble two aligned tubular members that are connected as previously described. Various embodiments of method 300 may include fewer operations than described, and other embodiments of method 300 include additional operations based on concepts presented in this specification, including the figures.

While exemplary embodiments have been shown and described, modifications thereof can be made by one of ordinary skill in the art without departing from the scope or teachings herein. For example, although castellated interface 118 was described as having a plurality of recesses 134 in a tubular member (e.g., box end 106) configured to receive a plurality of axial protrusions 135 in load shoulder member 110, other embodiments involve variations of this configuration. For example, in some embodiments, a castellated interface includes a plurality of axial protrusions in a tubular member that are engageable with (e.g., are receivable into) a plurality of recesses disposed in a load shoulder member. In some other embodiments, the number and size of features in a castellated interface may be equally distributed between a tubular member and a load shoulder member. As such, the tubular member and the load shoulder member may both be described as having a plurality of recesses and a plurality of axial protrusions. In some embodiments, a castellated interface includes recesses and axial protrusions that are configured overlap in the radial direction when they are engaged. Some embodiments include a splined interface between a tubular member and a load shoulder member. In such embodiments, the tubular member and a load shoulder member overlap when their interface is assembled or made-up.

Threaded regions 166, 190, 218, 244 were described as being straight threads, which in the examples discussed, were Acme threads having a single thread path. Other embodiments may include a different type of thread or additional thread paths. As an example, some of these other embodiments include trapezoidal threads.

The embodiments described herein are exemplary only and are not limiting. Many variations, combinations, and modifications of the systems, apparatuses, and processes described herein are possible and are within the scope of the disclosure. Accordingly, the scope of protection is not limited to the embodiments described herein, but is only limited by the claims that follow, the scope of which shall include all equivalents of the subject matter of the claims. The inclusion of any particular method step or operation within the written description or a figure does not necessarily mean that the particular step or operation is necessary to the method. The steps or operations of a method listed in the specification or the claims may be performed in any feasible order, except for those particular steps or operations, if any, for which a sequence is expressly stated. In some implementations two or more of the method steps or operations may be performed in parallel, rather than serially.

What is claimed is:

1. A connection between a first tubular member and a second tubular member, the connection comprising:
    a first tubular end including a first tubular end keyway;
    a second tubular end;
    a load shoulder member including a load shoulder member keyway and threadable onto the first tubular end;
    a nut receivable around the first tubular end and the load shoulder member and threadable onto the second tubular end; and
    wherein the load shoulder member is threadable onto the first tubular end until the load shoulder member keyway aligns with the first tubular end keyway to form an aligned keyway through the load shoulder member and into the first tubular end to receive a key member;
    wherein the first tubular end is a pin end and the second tubular end is a box end to receive the pin end.

2. The connection of claim 1 wherein the nut is threadable onto the second tubular end over the load shoulder member and the first tubular end to capture the load shoulder member between the nut and the second tubular end.

3. The connection of claim 1 further comprising a first threaded interface between the load shoulder member and the first tubular end, and a second threaded interface between the nut and the second tubular end, wherein the aligned keyway intersects the first threaded interface.

4. The connection of claim 3 wherein the connection lacks a threaded interface formed directly between the first tubular end and the second tubular end.

5. The connection of claim 1 further comprising a second tubular end recess to receive a load shoulder member protrusion.

6. The connection of claim 1 further comprising a plunger extending through the nut and into the first tubular end.

7. The connection of claim 1 wherein the box end includes external threads and lacks internal threads.

8. The connection of claim 1 wherein the box end is configured to receive the pin end at a slidingly-engageable, rotatable interface.

9. A method of connecting two aligned tubular members, the method comprising:
    sliding a nut over a first tubular pin end;
    threading a load shoulder member onto the first tubular pin end until a load shoulder member keyway aligns with a first tubular pin end keyway;
    inserting a key member into the aligned load shoulder member and first tubular pin end keyways;
    engaging the first tubular pin end with a second tubular box end such that a second tubular box end recess receives a load shoulder member protrusion; and
    threading the nut onto the second tubular box end.

10. The method of claim 9 further comprising disposing a pin in the nut and in the first tubular pin end after threading the nut onto the second tubular box end.

11. A connection between tubular members, comprising:
    a first tubular member having a first tubular end with a first externally threaded region and a seal region along an outer surface;

a second tubular member having a second tubular end with a second externally threaded region and a counter bore configured to slidingly receive the seal region;

a load shoulder member threadable onto the first externally threaded region to form a first threaded interface; and a nut receivable around the outer surface of the first tubular end and threadable onto the second externally threaded region to form a second threaded interface;

wherein the load shoulder member and the second tubular end are engageable to form a castellated interface;

wherein the first tubular end is a pin end and the second tubular end is a box end to receive the pin end.

12. The connection of claim 11 further comprising a keyway through the load shoulder member and into the first tubular end to receive a key member.

13. The connection of claim 11 wherein the connection lacks an interface configured to transfer torque directly between the first tubular end and the second tubular end.

14. The connection of claim 13 wherein the connection lacks an interface configured to transfer an axial load directly between the first tubular end and the second tubular end.

15. The connection of claim 11 wherein the load shoulder member is positioned within a volume defined by the first tubular end, the second tubular end, and the nut when the connection is assembled.

16. The connection of claim 15 wherein the load shoulder member is surrounded by the first tubular end, the second tubular end, and the nut when the connection is assembled.

17. The connection of claim 11 further comprising a rotation-inhibiting interface formed between the nut and the first tubular end.

18. The connection of claim 11 wherein the load shoulder member comprises a shoulder configured to engage the second tubular end at a shoulder interface and at the castellated interface, and wherein when the connection is made-up, the shoulder interface is tightened axially, and the castellated interface is not tightened axially.

19. The connection of claim 11 wherein the load shoulder member is configured with a first shoulder to form a first shoulder interface with the nut and a second shoulder to form a second shoulder interface with the second tubular end;

wherein the first or second threaded interface includes straight, Acme threads; and wherein, when the connection is made-up, the first and second shoulder interfaces are tightened axially to transfer an axial load.

* * * * *